United States Patent [19]
Merritt

[11] Patent Number: 5,398,653
[45] Date of Patent: Mar. 21, 1995

[54] INTERNAL COMBUSTION ENGINE

[75] Inventor: Dan Merritt, Coventry, England

[73] Assignee: Coventry University, Coventry, England

[21] Appl. No.: 84,573

[22] Filed: Jun. 29, 1993

[30] Foreign Application Priority Data

Jul. 2, 1992 [GB] United Kingdom ............... 9214044
Feb. 6, 1993 [GB] United Kingdom ............... 9302369

[51] Int. Cl.$^6$ .......................................... F02B 19/02
[52] U.S. Cl. ............................................. 123/292
[58] Field of Search ............... 123/292, 269, 289, 279, 123/263, 286, 277, 65 S, 260, 272, 276, 307, 51 AA, 51 R, 280, 281, 282, 285, 306, 307, 70 R, 71 R, 53 A, 261, 256, 52 B, 59 BS, 780, 290

[56] References Cited

U.S. PATENT DOCUMENTS

| | | | |
|---|---|---|---|
| 1,889,650 | 11/1932 | Fredricksen | 123/53 AA |
| 4,070,999 | 1/1978 | Matsuno | 123/260 |
| 4,104,995 | 8/1978 | Steinbock | 123/780 |
| 4,106,445 | 8/1978 | Beveridge | 123/53 A |
| 4,258,680 | 3/1981 | Eckart | 123/289 |
| 4,378,764 | 4/1983 | Jorgensen | 123/290 |
| 4,483,289 | 11/1984 | Paul et al. | 123/269 |
| 4,485,779 | 12/1984 | Spurk | 123/289 |
| 4,580,532 | 4/1986 | Jackson | 123/52 B |
| 4,586,465 | 5/1986 | Krogdahl | 123/59 BS |
| 4,759,319 | 7/1988 | Merritt | 123/51 AA |
| 4,898,126 | 2/1990 | Merritt | 123/53 A |
| 4,981,114 | 1/1991 | Skopil | 123/51 AA |
| 5,009,207 | 4/1991 | Merritt | 123/261 |
| 5,060,609 | 10/1991 | Merritt | 123/256 |
| 5,117,789 | 6/1992 | Merritt | 123/289 |

FOREIGN PATENT DOCUMENTS 2261028 10/1992 United Kingdom ............... 123/292

Primary Examiner—Raymond A. Nelli
Attorney, Agent, or Firm—Ware, Fressola, Van Der Sluys & Adolphson

[57] ABSTRACT

An internal combustion engine has first and second cylinders (12, 14), the first cylinder (12) having a larger swept volume than the second cylinder (14) and the second cylinder being formed in the crown of the first cylinder. First and second pistons (16, 18) are reciprocable respectively in the first and second cylinders (12, 14), the second piston (18) being formed as a protrusion on the crown of the first piston (16). The first cylinder has an air inlet (25) and an exhaust outlet (27) whilst a first fuel source (34) provides fuel to the second cylinder (14). The second piston has a crown (35) which is spaced from and connected to the crown (36) of the first piston and which has an edge (37) which is relatively thin in the axial direction compared to the spacing of the first piston crown from the second piston crown. This defines a combustion space (20) between the piston crowns and a side wall (14a) of the second cylinder (14) when the pistons are substantially at the inner dead center position. The combustion space (20) communicates with both cylinders (12,14) during part of the expansion stroke. A spark plug (52) is provided communicating with the combustion space. The ignition process is started with a spark and allowed to continue by compression ignition. After the spark ignition process begins, the flame raises the pressure and temperature of the gas in the combustion space sufficiently to cause compression-ignition of the remainder of the vaporized fuel as it ingresses into the combustion space under the action of the smaller piston and mixes with more air.

33 Claims, 11 Drawing Sheets

INTERNAL COMBUSTION ENGINE

FIELD OF THE INVENTION

The present invention relates to an internal combustion engine.

BACKGROUND OF THE INVENTION

Various internal combustion engines which can be classified as segregating engines invented by the applicant are known, for example from GB-A-2155546, GB-A-2186913, GB-A-2218153, GB-A-2218157, GB-A-2246394 and GB-A-2261028. Those engines are now known in the literature as the Merritt Engines.

The Merritt engine comprises at least one set of first and second cylinders and respective first and second pistons movable in said cylinders, in each set, the first cylinder having a larger swept volume than the second cylinder and there being an air inlet valve and/or port communicating with the first cylinder, an exhaust valve and/or port communicating with the first cylinder a fuel source for providing fuel to the second cylinder, means defining combustion space when the pistons are substantially at the inner dead centre position, the combustion space communicating with both cylinders during at least part of the expansion stroke, and inhibiting means for inhibiting ingression.

The term "air" as used herein includes any suitable mixture of oxygen with other usually inert gases as well as substantially pure oxygen for combustion with gaseous or liquid (i.e. vaporised liquid) fuel. It may contain recirculated exhaust gases, crankcase gases and a small proportion of hydrocarbon substances present in recirculated internal combustion engine gases.

The term "ingression" as used herein refers to the movement of fuel/air mixture from the second cylinder into the combustion space.

The Merritt engine is a segregating engine like the diesel engine with a difference that some small quantity of air is compressed with substantially all the fuel in the smaller second cylinder, whereas most of the air is compressed on its own in the larger first cylinder.

An important characteristic of segregating engines such as the diesel engine and the Merritt engine is the confinement of the fuel, away from most of the air, during most of the compression stroke of the engine. The Merritt Engine does so by using a smaller cylinder and piston which receives the fuel during the induction stroke and segregates it from the bulk of the air until the moment of ingression, near the end of the compression stroke. The smaller cylinder can be referred to as the fuel management cylinder.

A segregating engine is eminently suitable to use the process known as compression-ignition to ignite the fuel the since fuel is not mixed with enough air to ignite spontaneously during most of the compression stroke, even when high compression ratios are used. In a diesel engine, which is also a segregating engine, the timing of ignition is determined by the timing of fuel injection into the combustion space. In the Merritt Engines so far disclosed the control of ignition timing is effected by controlling the timing of the process of ingression, in other words the transfer of vaporised fuel from the fuel management cylinder into the combustion space. In Merritt engines using high compression ratios, ignition of some of the fuel can take place the moment fuel enters the combustion space and meets with the very hot air therein.

GB-A-2246394 describes a number of ways in which the timing of ingression and hence the timing of ignition can be controlled. In particular, the smaller cylinder is provided with access means to control the pressure in the smaller cylinder to a value below the pressure in the larger cylinder during the early part of the compression stroke, thereby inhibiting ingression prior to the smaller piston arriving at or near its inner dead centre position. The access means described in GB-A-2246394 preferably includes a first port opening into the smaller cylinder. The port may contain a variable flow area valve, or a throttle and a first valve, such as an actuated poppet valve, for controlling access of air and/or fuel through the first port during each cycle of the engine. The fuel source, which may comprise a liquid fuel injector, is preferably arranged upstream of the first valve.

The main advantages of segregating engines, such as the diesel and Merritt engines, is their ability to burn extremely lean overall fuel/air mixtures. The spark ignition engine which has a pre-mixed fuel/air mixture during the compression stroke, is limited to near stoichiometric fuel/air mixtures to allow a flame, initiated with a spark, to move across the whole fuel/air mixture volume in the combustion space. Very lean overall fuel/air mixtures result in an overall cooler expansion process which in turn leads to improved engine thermal efficiency and lower quantities of harmful $NO_x$ gases in the exhaust, particularly at part loads. The thermal efficiency of a reciprocating internal combustion engine rises with lean burn when mean temperatures following heat release fall from the high values encountered in stoichiometric combustion.

The main features for promoting very efficient reciprocating internal combustion engines are very fast combustion and lower gas temperatures following heat release.

The automotive or high speed diesel engine does not achieve fast combustion since, at higher speeds, it is unable to provide sufficient time for the liquid fuel fully to vaporise before it is ignited. On the other hand the diesel engine can promote lower gas temperatures following overall lean burn at part load. The Merritt engine can potentially achieve both faster combustion than the diesel engine under all conditions as well as low part load temperatures. In the Merritt Engine fuel is admitted into the fuel cylinder during the induction stroke and whilst segregated from the main bulk of air the fuel is given much more time to vaporise in a small quantity of air, before the fuel ingresses into the combustion space to ignite.

An example of the known Merritt engine is shown in FIG. 1 of the accompanying drawings which is a partial cross section through a part of the engine, reproduced from GB-A-2246394. This engine is a compression ignition engine which uses a spark plug for igniting the fuel/air mixture during starting and idling in the conventional spark ignition gasoline engine (SIGE) manner where the fuel/air mixture burns as a flame front. The engine is described briefly below and the reader is directed to GB-A-2246394 or corresponding U.S. Pat. No. 5,117,789 for a more detailed description.

The engine comprises a smaller piston 18 mounted on the crown 36 of the larger piston 16. The piston 18 includes a pillar 234 and a crown 35. It will be seen from FIG. 1 that the pillar 234 is curved in contour, the curve encouraging swirl of the air entering the combustion space 20 from the larger cylinder 12 and swirl of the fuel/air mixture following ingression into the combustion space 20. The combustion space is defined between pillar 234 and the wall, indicated generally at 14a, of the smaller cylinder 14. The shape and size of pillar are chosen to produce a suitable combustion volume of appropriate size and shape.

It will be noted that the crown 35 of the piston 18 has an edge with an axial thickness which is substantially less than the axial distance between the crowns 35 and 36 of the pistons 18 and 16. The crown 35 has a cylindrical peripheral edge 37 which is spaced slightly away from the wall 14a of the smaller cylinder to define inhibiting means in the form of an annular gap 128. The upper end of the smaller cylinder 14 as viewed in the drawing is formed with an optional peripheral groove 39 which provides a by-pass to promote ingression as described below. The upper end of the smaller cylinder 14 is provided with the access means comprising the second inlet valve 31 and the throttle valve 32. The fuel injector 34 is provided for delivering liquid fuel into the inlet duct 33. The throttle valve 32 controls the quantity of air flowing through inlet duct 33 and does so substantially independently of the quantity of the fuel delivered by the fuel injector 34.

During the induction stroke of the engine air enters the larger cylinder 12 through the inlet duct 25. Air also enters the smaller cylinder 14 through open valve 31 along with fuel from injector 34. The difference in pressure across the crown 35 of the piston 18 in the early part the compression stroke can be influenced by throttle valve 32 and the timing of the closure of valve 31. This in turn has an effect on the timing of ingression of the contents of the smaller cylinder 14 into the combustion space 20 near the inner dead centre position of the piston 18 towards the end of the compression stroke. Ingression in turn controls the timing of ignition of the vaporised fuel by compression ignition when the fuel/air mixture in cylinder 14 meets the hotter air delivered to the combustion space 20 by the larger piston 16 during the compression stroke.

The groove 39 has an axial length greater than the thickness of the smaller piston crown 35 to provide an enlarged gap for the fuel/air mixture to ingress around the crown through the bypass groove 39. The groove 39 also provides a clearance volume in the smaller cylinder 14 and this clearance volume effectively delays ingression timing by providing extra volume in cylinder 12 during the compression stroke.

The engine shown in FIG. 1 also has a throttle valve 23 Situated in inlet duct 25 which supplies air to the larger cylinder 12, and a spark plug 52. An exhaust valve and exhaust bort are not shown in FIG. 1 but are nevertheless present in the engine in communication with larger cylinder 12. The full line position of the pistons represents the outer dead centre position and the broken lines indicate the pistons at their inner dead centre position.

The purpose of using a spark plug in the known Merritt engine of FIG. 1 is to allow the engine to cope with marginal conditions such as idling and starting. In particular, under low part load conditions the fuel/air ratio in the smaller cylinder could reach a near stoichiometric value ignitable by compression ignition. To avoid this problem, throttle 32 can be partially closed to maintain the fuel/air ratio in the smaller cylinder 14 above the level at which spontaneous compression ignition occurs. However, the reduction in pressure which occurs in the smaller cylinder as a result of this throttling may increase the flow of air from the larger cylinder 12 across the gap 128 into the smaller cylinder 14, thus reducing the fuel/air mixture ratio back towards stoichiometric, and re-establishing the risk of spontaneous compression ignition in the smaller cylinder 14, before ingression commences. To prevent this the throttle valve 23 is used to reduce the compression pressures in the larger cylinder 12 by reducing the air intake to the engine. The effect of this is to reduce the flow of air across the gap 128 into the second cylinder, again removing the risk of spontaneous compression ignition before ingression. The peak compression pressure and temperature also reduce as a result of the air flow reduction by the throttle 23. With reduced end of compression temperatures, the fuel/air mixture may not ignite by compression ignition and the spark plug 52 can then be used to ignite the mixture in the conventional spark ignition manner as the mixture ingresses. The fuel/air mixture then burns as a flame front which is propagated through the mixture in the conventional spark ignited gasoline engine manner.

SUMMARY OF THE INVENTION

The present invention seeks to provide an improved internal combustion engine and a method of operating same.

Accordingly, the present invention provides an internal combustion engine comprising:
- at least one set of first and second cylinders, said first cylinder having a larger swept volume than said second cylinder;
- respective first and second pistons movable in said first and second cylinders;
- air inlet means communicating with said first cylinder;
- exhaust means communicating with said first cylinder;
- a first fuel source for providing fuel to said second cylinder;
- means defining a combustion space when said first and second pistons are substantially at an inner dead centre position, said combustion space communicating with both said first and second cylinders during an expansion stroke of said first and second pistons;
- ignition means communicating with said combustion space;
- inhibiting means for inhibiting ingression of fuel/air mixture from said second cylinder into said combustion space prior to said second piston reaching a preselected point in a compression stroke;
- control means for triggering said ignition means to discharge ignition energy into said combustion space after commencement of said ingression and prior to completion of said ingression to ignite a portion of ingressing fuel thereby to raise temperature and pressure in said combustion space to levels sufficient to ignite a remainder of said fuel by compression ignition;
- and means for ensuring that said pressure and temperature reached in said combustion space near an end of said compression stroke are insufficient to cause spontaneous compression ignition of fuel used.

The present invention also provides a method of operating an internal combustion engine wherein the engine has:

at least one set of first and second cylinders, said first cylinder having a larger swept volume than said second cylinder;

respective first and second pistons movable in said first and second cylinders;

air inlet means communicating with said first cylinder;

exhaust means communicating with said first cylinder;

a first fuel source for providing fuel to said second cylinder;

means defining a combustion space when said first and second pistons are substantially at an inner dead centre position, said combustion space communicating with both said first and second cylinders during an expansion stroke of said first and second pistons;

ignition means communicating with said combustion space;

inhibiting means for inhibiting ingression of fuel/air mixture from said second cylinder into said combustion space prior to said second piston reaching a preselected point in a compression stroke;

control means for triggering said ignition means;

and means for ensuring that a pressure and temperature reached in said combustion space near an end of said compression stroke are insufficient to cause spontaneous compression ignition of fuel used;

wherein the method comprises:

introducing a first preselected quantity of fuel into said second cylinder during an induction and/or said compression stroke of said engine;

and discharging ignition energy into said combustion space after commencement of said ingression and prior to completion of said ingression to ignite a portion of ingressing fuel thereby to raise said temperature and pressure in said combustion space to levels sufficient to ignite a remainder of said fuel by compression ignition.

A modified way to operate and control the timing of ignition in the Merritt Engine according to the present invention is to start the ignition process with a spark and allow the process to continue by compression ignition i.e. spark triggered compression ignition (STCI).

The preferred form of the present invention relies on spark ignition to initiate combustion under all operating conditions. For this purpose, the geometric compression ratio of the engine is chosen sufficiently low to avoid spontaneous compression ignition for the fuel in use. However, spark ignition in the conventional, known manner requires a near homogeneous fuel/air mixture to allow the propagation of a flame front through the mixture and this is achieved in the conventional spark ignition gasoline engine (SIGE).

Spark triggered compression ignition in the present invention is a different process. The ignition by spark is the first of a two stage ignition processes, namely spark-ignition and compression-ignition. In the first stage spark-ignition only initiates a localised flame at the boundary between the ingressing fuel and air in the combustion space. The flame may be short lived and is unlikely to propagate into a pre-mixed fuel/air mixture which does not exist at that moment. This spark ignition occurs before the completion of the ingression process, in other words before all the fuel has had time to transfer from the smaller cylinder into the combustion space across the smaller piston crown and to mix with all the air needed for its combustion which is present in the combustion space. The spark ignition stage is a process similar to that of igniting with a spark a jet of gaseous fuel emerging from a jet whilst it mixes with air on the periphery of the jet. After the spark ignition process begins, the flame raises the pressure and temperature of the gas in the combustion space sufficiently to cause compression-ignition of the remainder of the vaporised fuel as it ingresses into the combustion space under the action of the smaller piston and mixes with more air. This process is described as Spark Triggered Compression Ignition (STCI). The processes of mixing and burning fuel vapour with further air needed to complete combustion proceeds beyond the instant of spark ignition. In the common spark ignition engine (SIGE) the mixing process between fuel and air is almost complete before the appearance of the spark.

An important advantage of using spark triggered compression ignition is the ease with which it can be timed to meet variable engine conditions. When using spark triggered compression ignition the precision of control required over the timing of the process of ingression can be less important and less critical to the operation of the engine.

To achieve spark triggered compression ignition an engine system can operate with compression ratios which are insufficient to ignite by compression the particular fuel chosen, during the early moments of ingression. Alternatively, throttle 23 may be used to adjust end of compression pressures and temperatures. For example, in the case of gasoline the compression ratio may be lowered to a value of say 12:1 for spark triggered compression-ignition, whereas if compression ignition were to be used on its own with such a fuel a compression ratio value of for example 18:1 may be needed. The second requirement is to position a spark plug in a place where it meets fuel vapour whilst it mixes with the air in the combustion space in the early part of the ingression process. The spark plug provides a spark at the correct time to initiate the compression ignition process.

After igniting some of the fuel which has already started ingressing into the combustion space, the pressure and mean temperature of the gas in the combustion space rises. This results in the remainder of the vaporised fuel, which continues to ingress into the combustion space and mix with the air therein, being ignited by compression ignition even if the original flame started by the spark fails to traverse across the whole combustion space.

The size of volume of the combustion space relative to the size of the swept volume of the two pistons provides the means to determine the compression ratio of the engine and strongly influence the magnitude of pressure and temperature of the gases near the end of the compression stroke just before ignition occurs. The pressure and temperature conditions must be insufficient to induce spontaneous compression ignition of fuel, before the ignition means is operated to start the ignition process.

A preferred form of the ignition means is a spark plug which is energised in the normal way and timed by control means such as an engine management system M functioning as the ignition control means. The spark has to ignite a rich mixture of fuel and air during an early part of the ingression process when air driven into the combustion space in a swirl motion begins to combine with the fuel vapour after the start of the ingression process. Such an ignition process also occurs when a jet of fuel gas delivers fuel under pressure into air and is ignited by a spark. The spark ignition process may not be successful if the primary rich mixture of fuel vapour and air are not ignited in the presence of further air which mixes with it during the ingression process. Once spark ignition takes place the flame originating from the spark need not be sustained until it burns all the fuel being ingressed into the combustion space, since the pressure and temperature rise following the spark ignition ensures that further fuel gas from now on is ignited by compression-ignition as and when it moves across the crown of the smaller cylinder into the combustion space.

The smaller cylinder may be formed so as to provide an abrupt or gradual ingression characteristics. For example, the smaller cylinder may be formed at its end remote from the larger cylinder with means for defining a by-pass around the edge of the smaller piston crown when it is adjacent to its inner dead centre position. In this way the peripheral edge of the smaller piston crown may lie close to the wall of the smaller cylinder during the majority of the piston stroke. However, once the edge of the smaller piston crown lies adjacent the by-pass, the gap between the peripheral edge of the smaller piston crown and the wall of the smaller piston effectively increase to enable rapid ingression through the by-pass. The by-pass preferably has an axial length which is greater than the thickness of the edge of the smaller piston crown. Conveniently, the bypass may take the form of a groove formed in the wall of the smaller cylinder which may extend over the whole or part of the circumference of the smaller cylinder.

The provision of the by-pass is most beneficial in that it provides a clearance volume for the vaporised fuel and air in the smaller cylinder which delays ingression and also provides a path for flame from the combustion space to reach any fuel remaining above the piston crown after ingression. Also the provision of the groove can help exhaust gases remaining above the smaller piston crown to escape at the end of the exhaust stroke.

One of the important functions of the bypass is to provide a clearance volume at the upper end of the smaller cylinder. The geometric compression ratio of the smaller cylinder is the ratio of its swept volume plus clearance volume to its clearance volume Similarly the geometric compression ratio of the larger cylinder is the ratio of its swept volume plus combustion space volume to its combustion space volume, if 'bump' and other clearance volumes are ignored. The relative value of the two geometric compression ratios will exert a strong influence on the timing of ingression. Since the use of spark triggered compression ignition requires a lower geometric compression ratio hence a larger combustion space volume, the volume contained within the bypass will also have to increase in order to lower the geometric compression ratio of the smaller cylinder, otherwise ingression may take place too early. The 'bump clearance' above the crown of the smaller piston is preferably kept small in order to minimise the amount of fuel which may be trapped above this crown at the end of the compression stroke.

The increased size of the by-pass may offer one suitable location for the spark plug used to initiate the spark triggered compression ignition process. Other suitable positions may be slightly below the bypass depending on the design of the engine.

The inhibiting means for inhibiting premature ingression is a suitably designed gap between the edge of the crown of the smaller piston and the smaller cylinder wall. With such a gap provision must be made to control the gas pressure in the smaller cylinder above the crown of the smaller piston to remain below the air pressure in the combustion space on the other side of the smaller piston crown until the moment of ingression. Such control can be effected by the access means as described above. As ignition awaits the appearance of a spark the precise timing of ingression is less critical in the spark triggered compression ignition Merritt engine than it is in the case of the Merritt engine which only relies on compression ignition since in the latter case the timing of ignition is determined by the timing of ingression.

BRIEF DESCRIPTION OF THE DRAWINGS

The present invention is further described hereinafter, by way of example, with reference to the accompanying drawings, in which.

The ignition method in accordance with this invention requires the use of spark ignition during most or all operational modes of the engine over its full speed and load range.

DETAILED DESCRIPTION OF THE DRAWINGS

Figure 2:
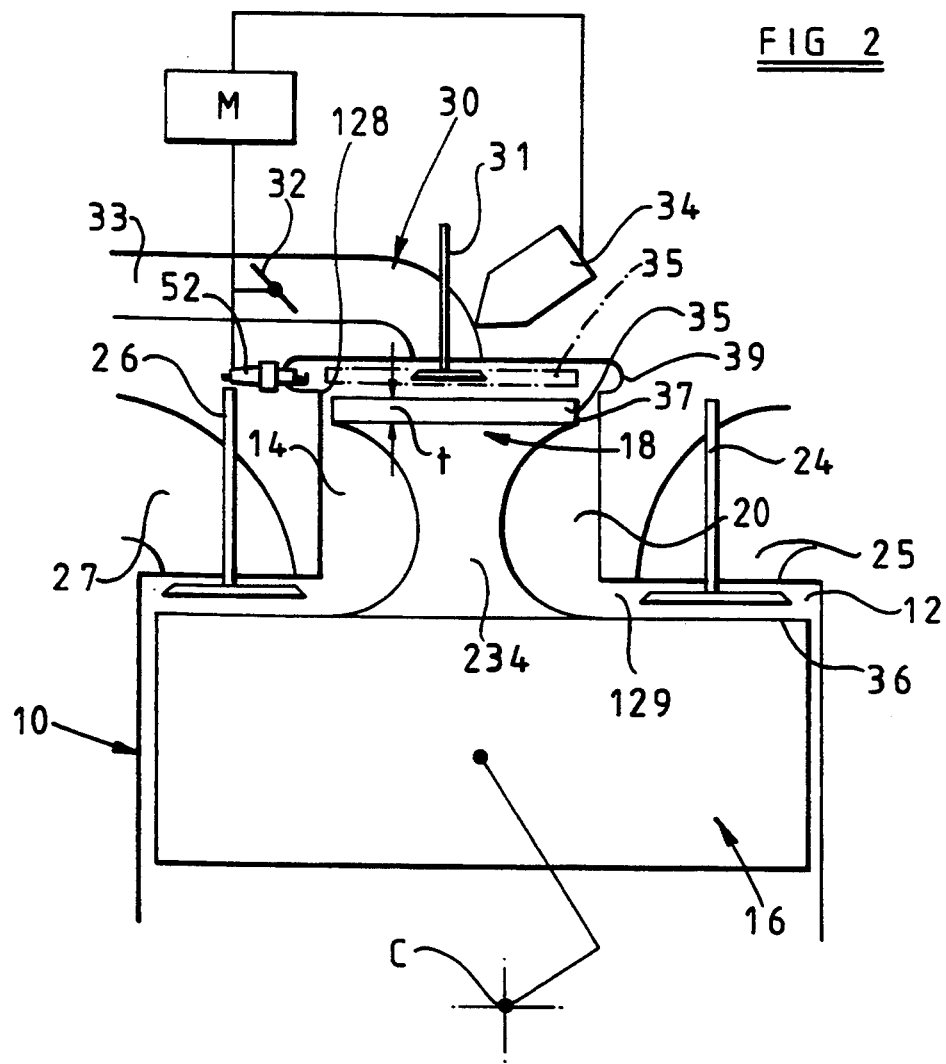
FIG. 2 is a diagrammatic cross section through a first embodiment of an engine in accordance with the present invention.

Referring to FIG. 2, the engine's geometrical compression ratio may be lowered to a point where compression ignition of the fuel used will not take place, for example below 12:1 for very high octane gasolines and below 10:1 for mid-range Octane rating gasoline. This design feature will ensure that the pre-vaporised fuel being transferred, or ingressed, from the smaller cylinder 14 into the combustion space 20 does not ignite spontaneously on contact with the air in the combustion space but awaits the spark generated on spark plug 52 using external control. The spark plug ignites a rich mixture of pre-vaporised fuel in some air at the moment when it begins to mix with some more air and under such conditions spark ignition can take place reliably.

Spark ignition only affects the fuel which has been ingressed across the crown 35 of the smaller piston by the time spark ignition has taken place. The pressure and temperature rise associated with the combustion initiated by the spark subjects the remainder of the fuel ingressing across the piston crown 35 to ignition by compression-ignition.

The main advantage of this method of operation is a much simpler ignition control, through the energising of a spark plug. The exact moment of ingression is no longer critical and ingression can start earlier than is possible with purely compression-ignition Merritt Engines operating without spark assistance.

The lowering of compression ratio only slightly reduces the theoretical thermal efficiency potential of the engine. To balance this effect the increased size of the combustion space reduces the relative effect of parasitic volumes elsewhere and allow better gas movement during combustion.

Figure 1:
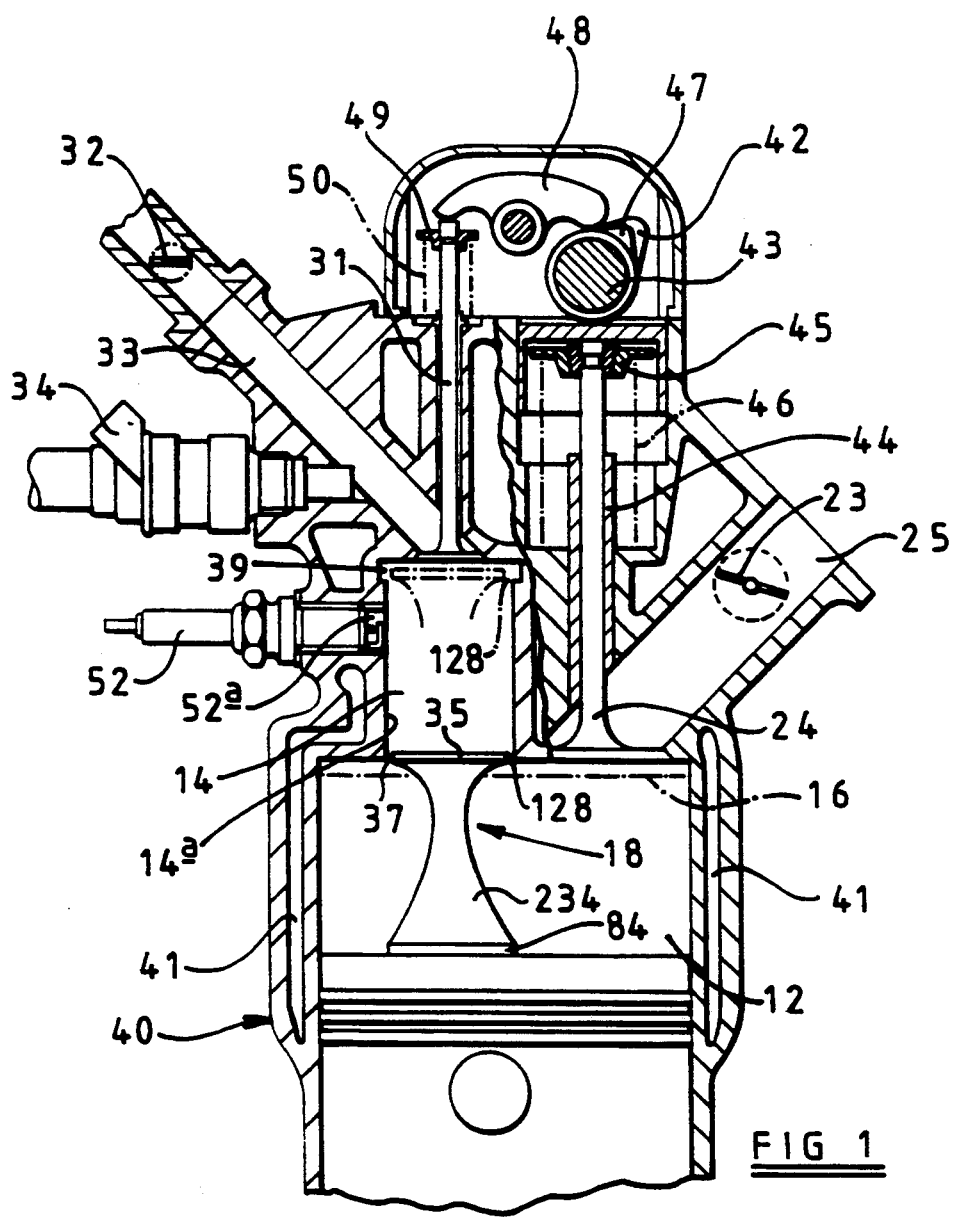
FIG. 1 is a partial cross section through one embodiment of a known Merritt engine.
Figure 2A:
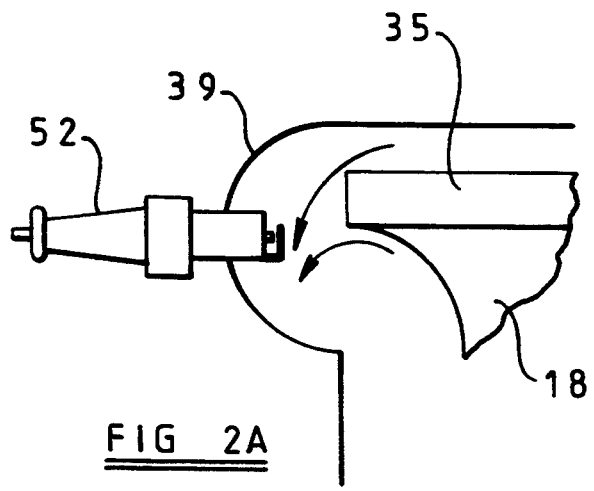
FIG. 2A is an enlarged view of part of FIG. 2 showing one possible position for a spark plug in relation to gas movement.
Figure 2B:
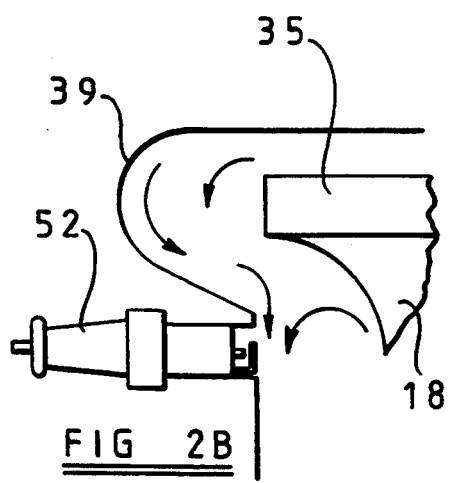
FIG. 2B shows a variation of FIG. 2A.

FIG. 2 schematically reproduces FIG. 1 to show the importance of the location of spark plug 52. Two possible positions are shown. In FIG. 2A the spark plug is shown situated inside the by-pass cavity 39 in a strategic place where the fuel vapour meets air circulating under the crown of the smaller piston. The air flow direction is illustrated diagrammatically with a thick arrow and the fuel with a thin arrow. In FIG. 2B the spark plug is shown positioned just below the by-pass cavity 39. In such a case spark ignition can be advantageously timed to occur as soon as the smaller piston crown begins to uncover the cavity 39.

Figure 15:
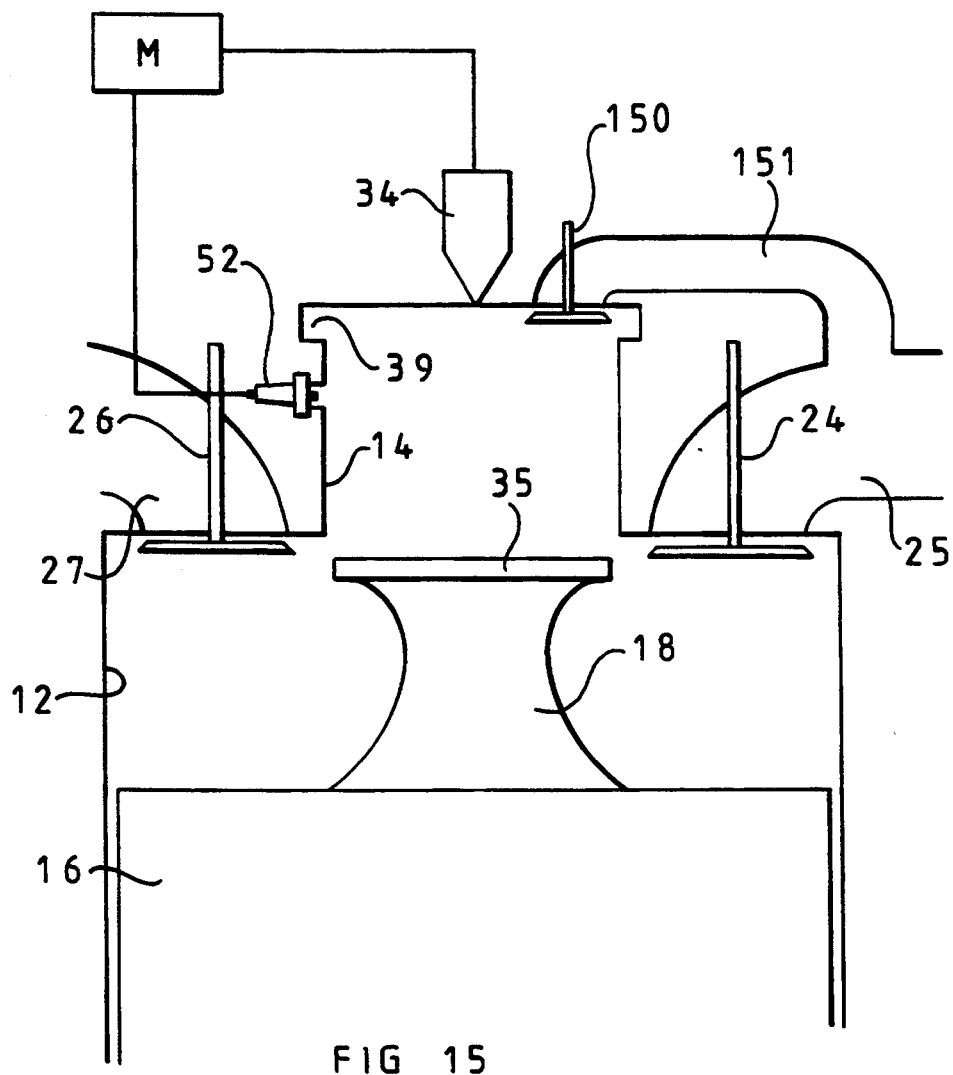
FIG. 15 is a view of the embodiment of FIG. 5 showing the pistons at the outer dead centre position.

It will be appreciated that many of the construction features of the engine described in GB-A-2246394 apply to the present invention. Common features in need of mention in particular are the construction of the smaller piston in relation to pillars which is the same, as are the provision of a second by-pass groove 135 at the lower end of the smaller cylinder 14, the optional provision of a base 84 for the smaller piston at or adjacent the larger piston crown 36, the methods for promoting air swirl of the air entering the combustion space 20. The construction of the engine to operate on the two stroke cycle shown in GB-A-2246394 FIG. 15 and FIG. 16 is particularly suitable for the ignition method of the present invention.

The description of hybrid engines in GB-A-2246394 is applicable to the present invention. The diesel hybrid, shown in FIG. 6 and FIG. 7 in GB-A-2246394 can be assisted by spark ignition in accordance with the present invention, as described further below with reference to FIGS. 10 to 12.

Figure 3:
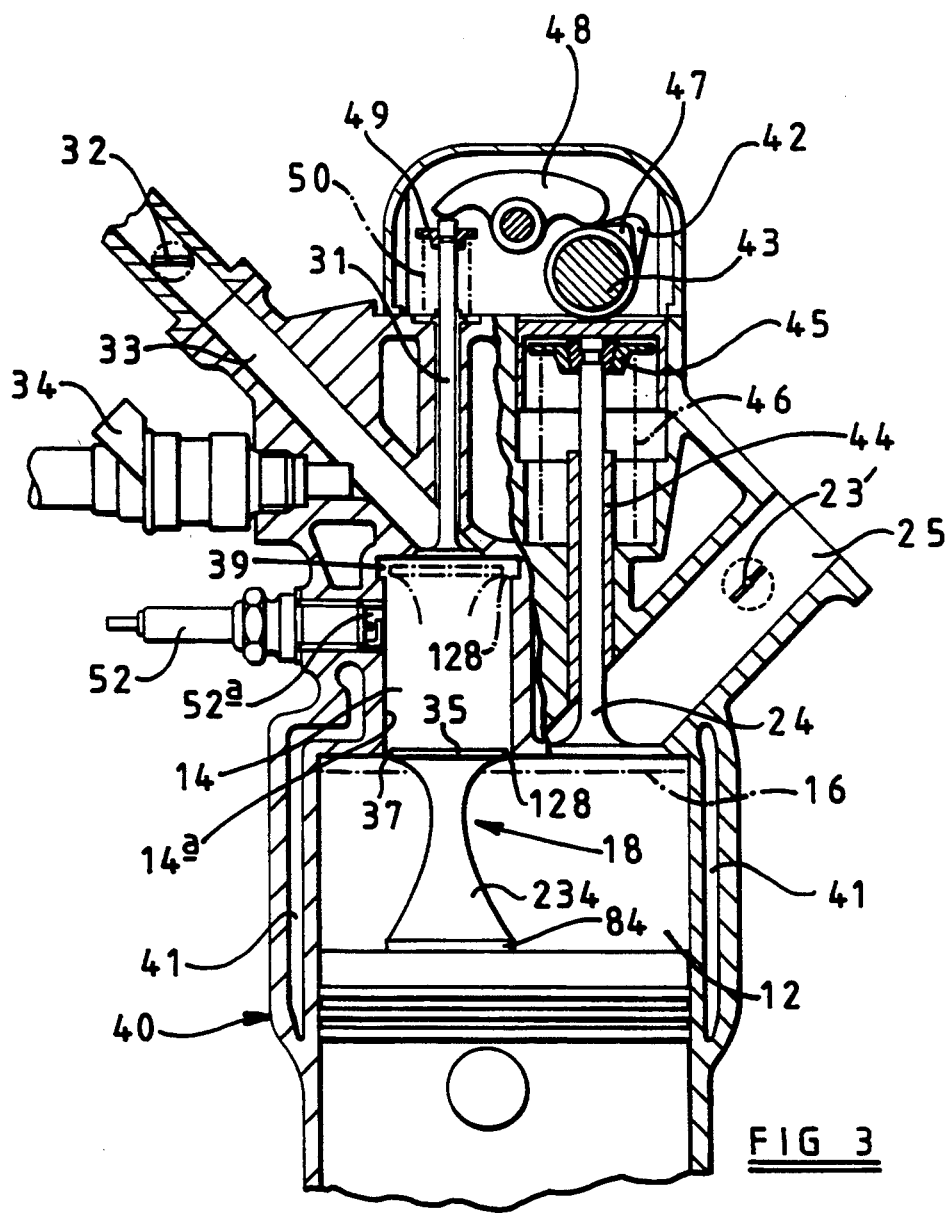
FIG. 3 shows a practical form of the engine of FIG. 2.

Referring now to FIG. 3, this shows a construction of engine which is identical to that of FIG. 1 with the exception that the throttle valve 23' has a smaller vane to provide only marginal control. When operated in accordance with the present invention in four stroke mode, air is drawn in through the air inlet 25 with no throttling being effected under normal conditions. Fuel is injected by fuel injector 34 into the fuel inlet passage 33. The fuel can be injected at any time since it cannot pass into the smaller cylinder 14 until valve 31 is opened. During the induction stroke, valve 31 is opened to allow fuel and air to enter the smaller cylinder 14. During the compression stroke the pressure in the smaller cylinder 14 rises less quickly than the pressure in the larger cylinder 12, partially due to the clearance volume provided by the groove 39 being designed to provide this effect.

Towards the end of the compression stroke ingression takes place and some fuel passes through the gap 128 into the combustion space. The spark plug is energised after ingression starts and preferably before the pistons reach the inner dead centre position. The initial combustion of the fuel/air mixture which occurs raises the pressure and temperature in the combustion space sufficiently to allow the remainder of the fuel/air mixture which ingresses through gap 128 to ignite spontaneously by compression ignition. This happens even if the initial flame created by the spark does not manage to reach this fuel.

At the end of the expansion stroke the exhaust valve (not shown) for the larger cylinder 12 opens to allow exhaustion of the combustion products. A separate exhaust port may or may not be provided for the smaller cylinder 14.

The throttle 23' can be used to lower slightly the air intake during the induction stroke as fine tuning in order to avoid the possibility of compression ignition of the fuel after ingression but before generation of the spark. This can happen with, for example, poor fuel or on a hot day.

The throttle valve 32 is also optional and can be used to assist in the control of ingression timing although with STCI such control is normally not necessary.

There are a number of arrangements for controlling the breathing of the smaller cylinder and these are described below with reference to FIGS. 4 to 9.

Figure 4:
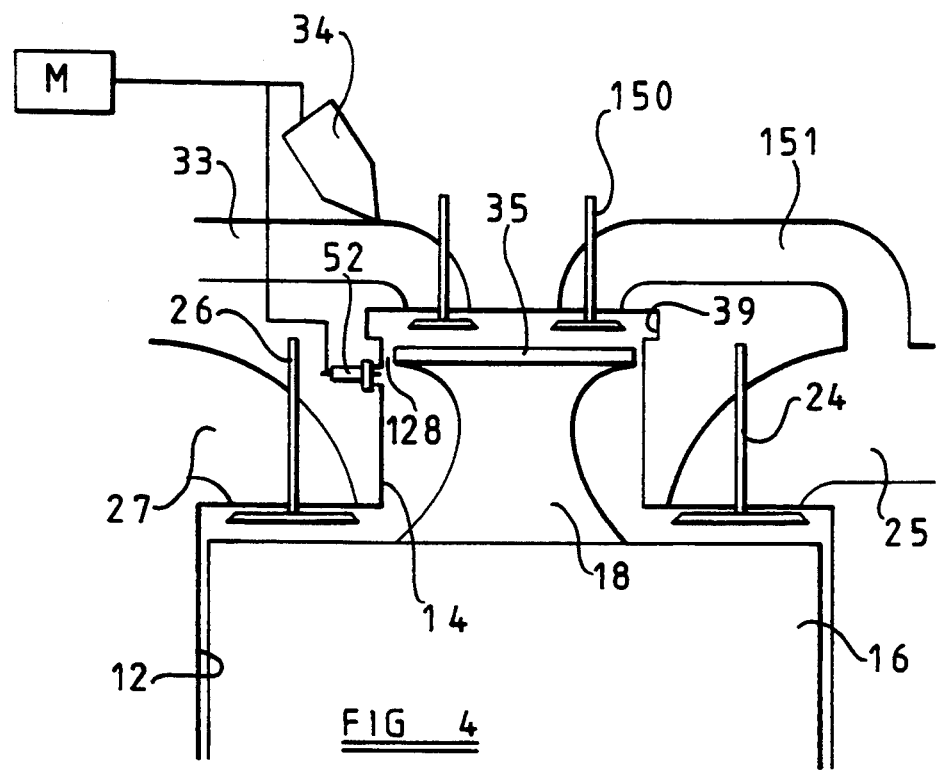
FIGS. 4 to 9 and 14 illustrate various embodiments of the engine according to the present showing various ways in which breathing of the smaller cylinder may be accomplished.

Referring now to FIG. 4, this is a diagrammatic cross-section through a preferred form of the invention illustrating the breathing of the smaller cylinder 14 using two valves. The smaller cylinder has an inlet valve 31 and an exhaust valve 150 working independently. Fuel is injected into the inlet duct 33 at any time as mentioned previously with regard to FIG. 3. The exhaust duct 151 is preferably connected to the main air inlet duct 25 supplying the larger cylinder 12 with air. This traps any unburned fuel, reducing the exhaust emissions as well as providing exhaust gas re-circulation which rises in proportion to the engine load.

Figure 6:
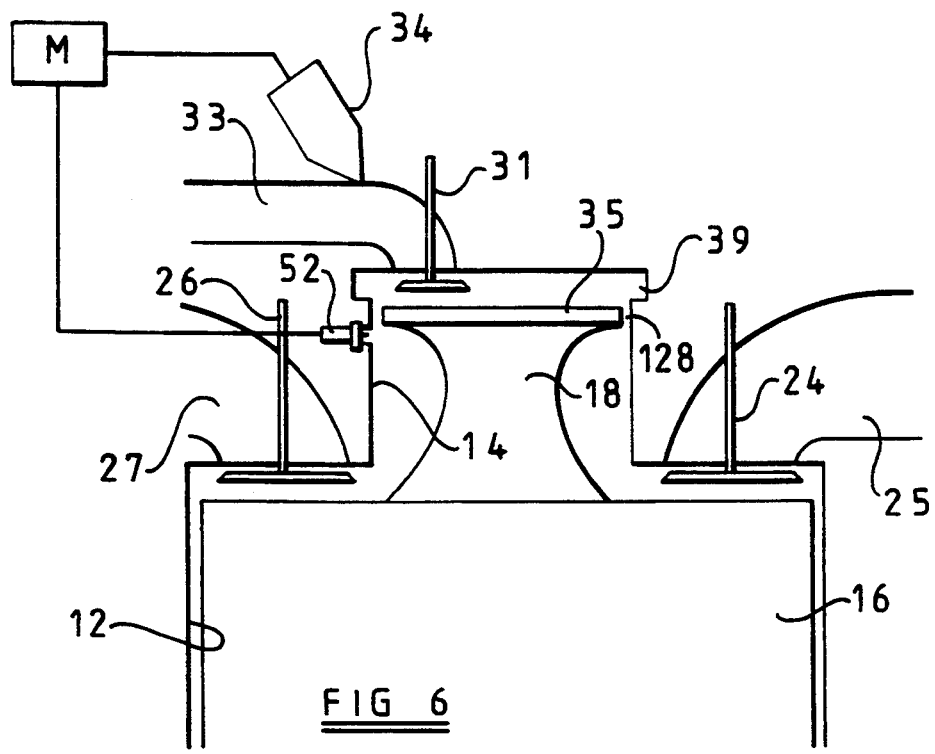

FIG. 6 is a view similar to that of FIG. 4 illustrating the breathing of the smaller cylinder 14 using only one valve 31 which is an inlet valve. The fuel injector 34 is shielded by the valve 31 from combustion pressures and temperatures. Exhaust gases are exhausted through the gap 128, the larger cylinder 12 and exhaust duct 27.

Figure 7:
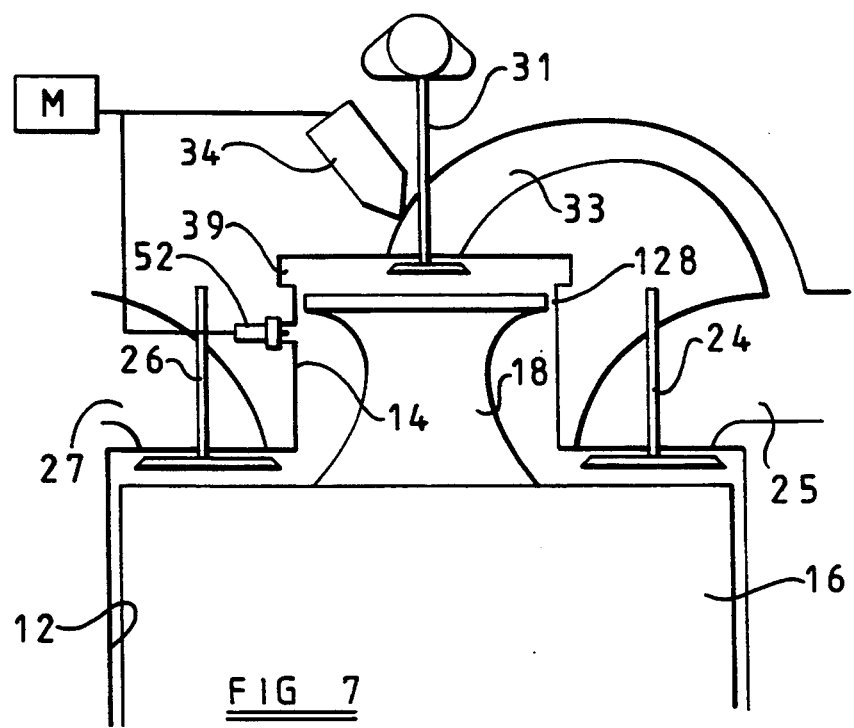

FIG. 7 shows a further method of breathing control for the smaller cylinder 14 using a single valve 31 acting as both inlet and exhaust for the smaller cylinder 14. The transfer of gases to and from the smaller cylinder 14 is assisted by opening valve 31 twice during one engine cycle, when operating on the four stroke sequence, once during the exhaust stroke and again during the induction stroke.

The opening of valve 31 during the exhaust stroke allows an easy escape for the exhaust gas trapped above the piston crown 35. The inlet/exhaust duct 33 is connected to the air inlet duct 25 of the larger cylinder 12 as described with reference to FIG. 4. The fuel injector 34 delivers fuel in the vicinity of the valve 31 during the induction stroke to avoid fuel being blown into the larger cylinder during the exhaust stroke.

Figure 5:
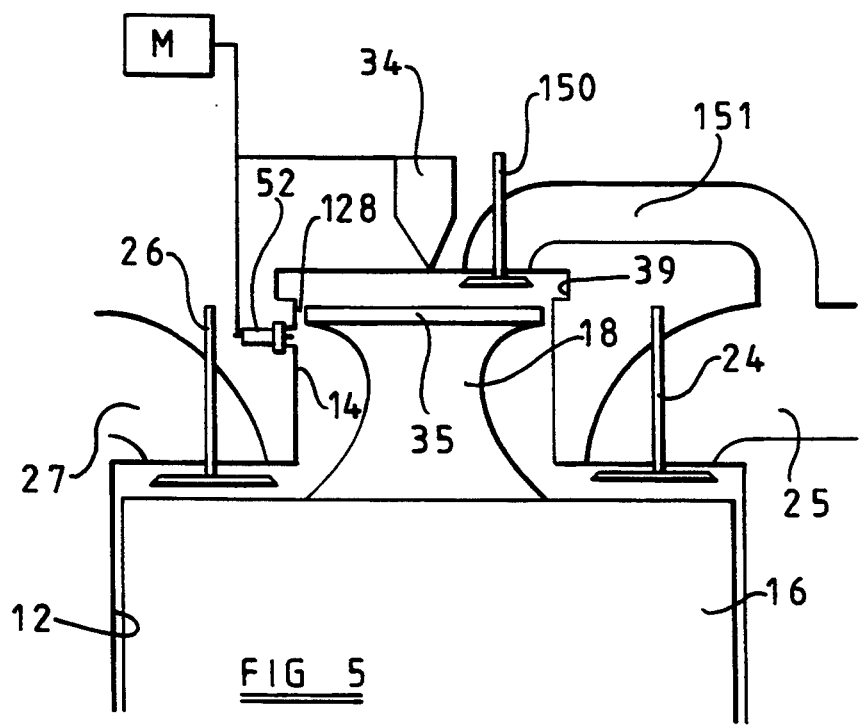

FIG. 5 is a diagrammatic cross-section through a further form of the invention illustrating the breathing out of the smaller cylinder using one valve. The smaller cylinder has one exhaust valve 150 and a fuel injector 34 which discharges directly into the smaller cylinder 14 from as early as the start of the induction stroke. The exhaust gases leaving the smaller cylinder 14 during the exhaust stroke can advantageously be directed into the inlet duct 25 which supplies air to the larger cylinder 12, again as described with reference to FIG. 4.

During the induction stroke air enters the smaller cylinder 14 through the annular gap 128 around the crown of the smaller piston 18. The pumping loss caused by this is small, possibly less than 0.1 bar if the area of the crown of the smaller piston is 10% of that of the larger piston.

Figure 8:
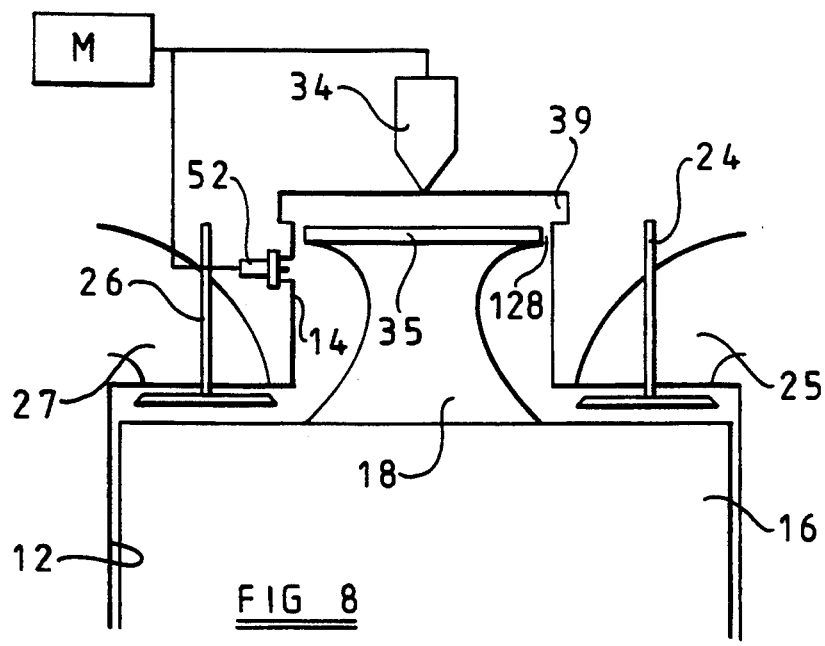

FIG. 8 is a schematic diagram of a further form of the invention, similar to that of FIGS. 4 and 5, illustrating the breathing of the smaller cylinder without valves. Since the smaller cylinder 14 has no inlet or exhaust valves of its own it receives air and exhausts combustion gases through the main inlet and exhaust ducts 25, 27 of the larger cylinder 12, the gases passing between the two cylinders through the gap 128 around the smaller piston crown. This arrangement has the advantage of mechanical simplicity at the expense of some added pumping losses and possibly some exhaust emissions of hydrocarbons and carbon monoxide.

Figure 9:
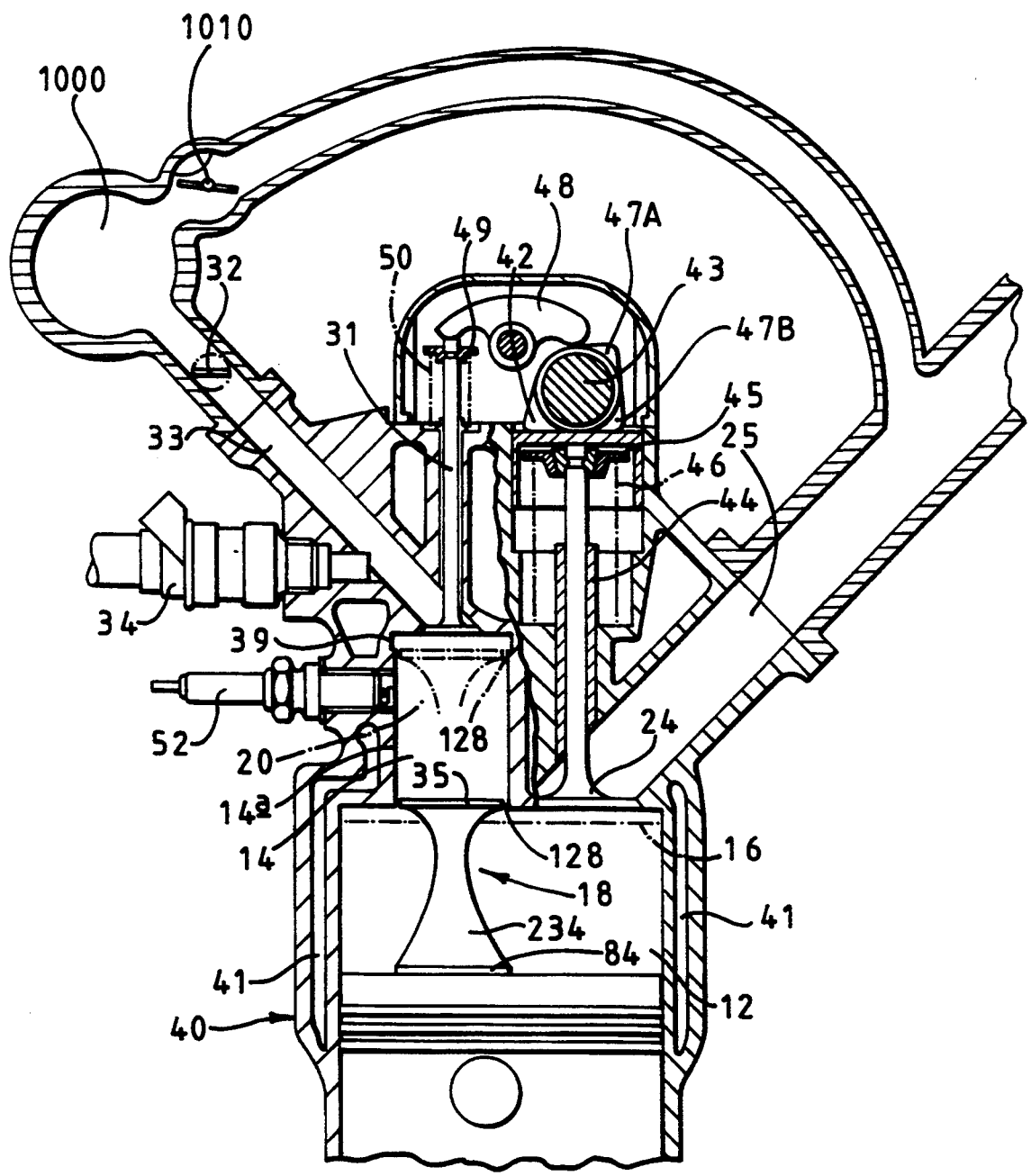

FIG. 9 is a more detailed view of the engine of FIG. 7 showing the addition of a closed container 1000 which may communicate with the inlet duct 25 by way of a valve 1010.

The engine performance as a segregating Merritt Engine is improved by containing the exhaust gases delivered through valve 31 in the container 1000. This is chosen with a volume which gives a suitable pressure rise in the container at the end of the exhaust stroke. The volume may be fixed or it may be variable, for instance by means of a plunger movable in a tube (not shown). The volume may be contained in a bulb, as shown, or it may be the volume of the duct connected to the port of valve 31, if the duct is sealed at its other end. Throttle valve 32 may be useful in controlling the flow to and from the port of valve 31 but this may not be necessary.

The hot exhaust gases trapped in volume 1000 when valve 31 closes are at a pressure slightly above atmospheric pressure. They also contain any unburned fuel which remains above the crown 35 of the smaller piston. Fuel injector 34 discharges its fuel into this trapped gas. The fuel injector may be situated where shown or it may discharge directly into bulb 1000 if this location helps to vaporise the fuel more effectively. The timing of fuel injection may be chosen to promote best vaporisation of the fuel since it can possibly take place during any part of the cycle.

When valve 31 opens again during the induction stroke, the slightly pressurised gases in the bulb 1000, or in the sealed duct if used instead, rush into cylinder 14 carrying the fuel vapour with them. The products of combustion from the previous cycle assist in the vaporisation of the fuel and also inhibit the formation of oxides of nitrogen promoting "exhaust gas recirculation" which is a recognised method of controlling exhaust emission of $NO_x$.

The pressure build up in the bulb 1000 depends on engine speed. At low speed there may not be sufficient pressure to ensure a good induction process following the exhaust process. To overcome this the bulb 1000 is connected to the inlet duct 25 by way of valve 1010 which may open under low speed conditions or whenever the peak pressure in the bulb falls below a desired value. When valve 1010 opens the exhaust gases are delivered into the inlet duct 25 leading to the larger cylinder 12 for recirculation and the induction air is drawn from the inlet manifold supplying the larger cylinder.

Valve 1010 can be controlled by the engine management system or it may operate automatically under the direct influence of the pressure level in the bulb 1000.

Figure 14:
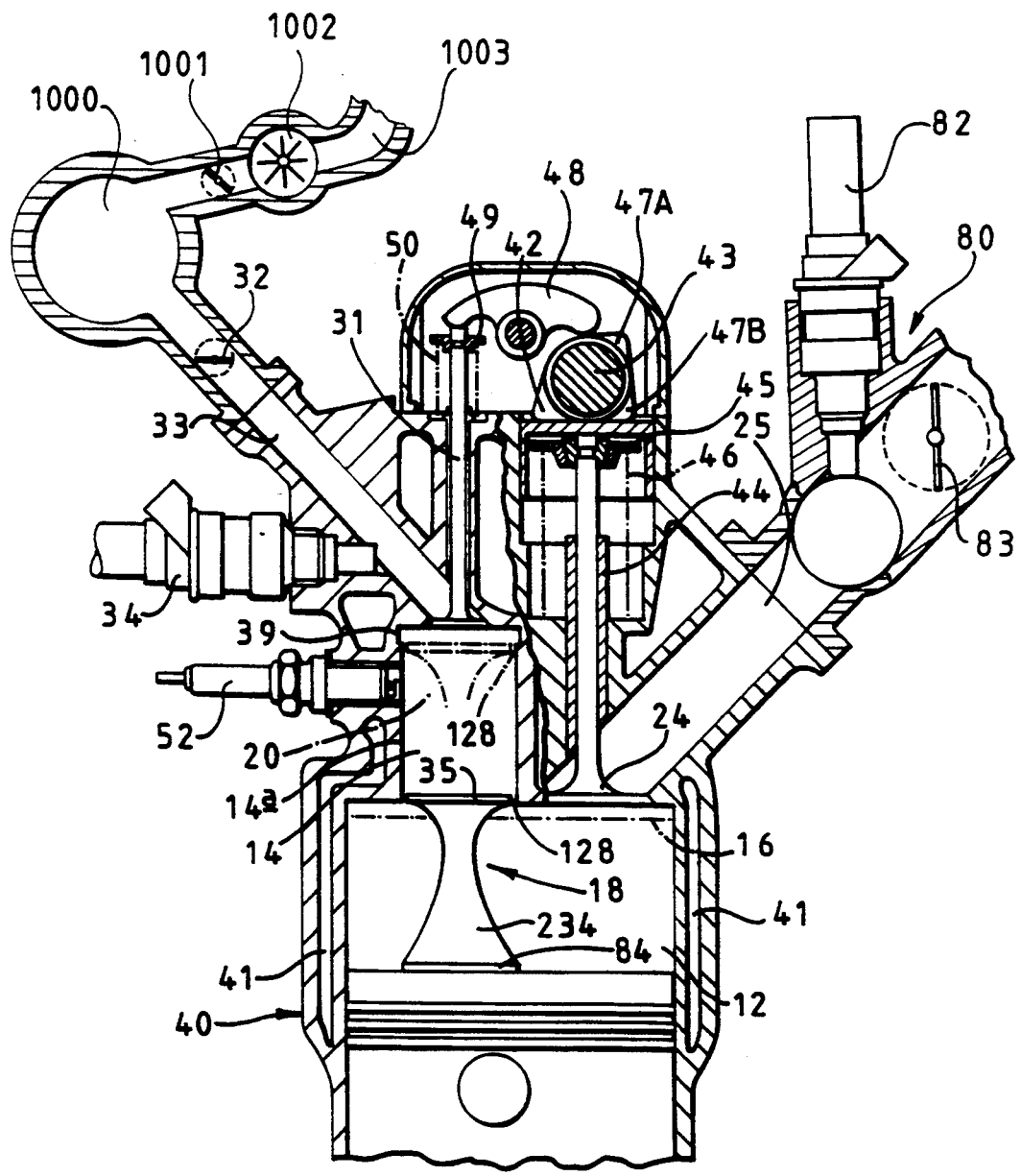

An alternative way to ensure a positive supply of air into the smaller cylinder 14 is shown in FIG. 14. Here a small fan or blower 1002 is used to induce air under pressure into the smaller cylinder during the induction stroke. The fan may be switched on when necessary by the engine management system. The fan may operate in conjunction with the bulb 1000, if desired, by incorporating valve 1001 which remains closed during bulb operation and opens when the fan is required and is brought into operation.

It will be appreciated that the control of the induction process to the smaller cylinder is most important when the fuel injector 34 is positioned behind valve 31. This arrangement allows the fuel injector to be shielded from combustion pressures and temperatures.

Figure 10:
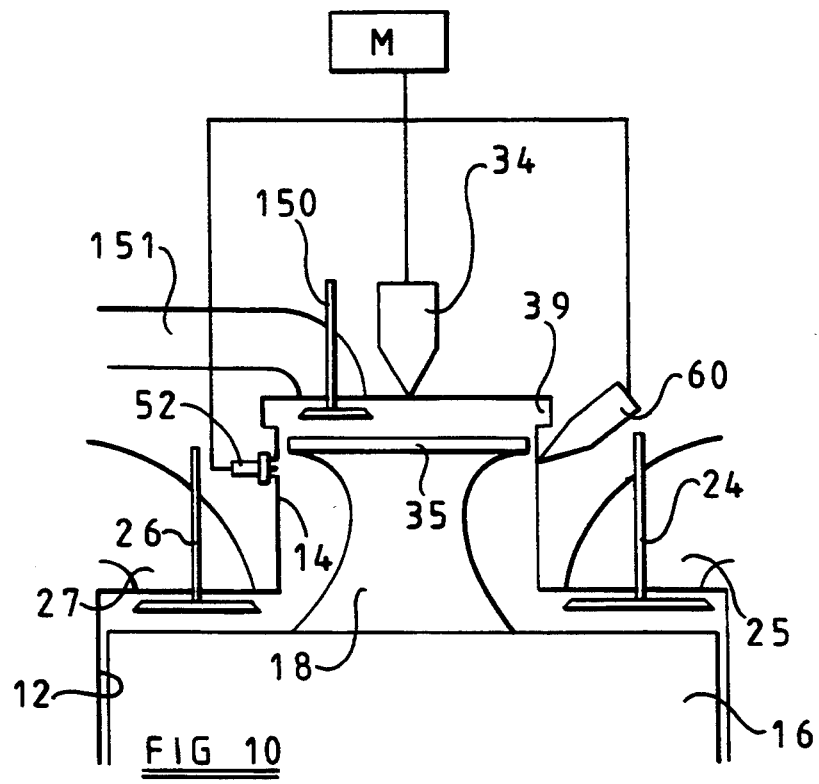
FIGS. 10 to 13 show further embodiments of engine according to the present invention.
Figure 12:
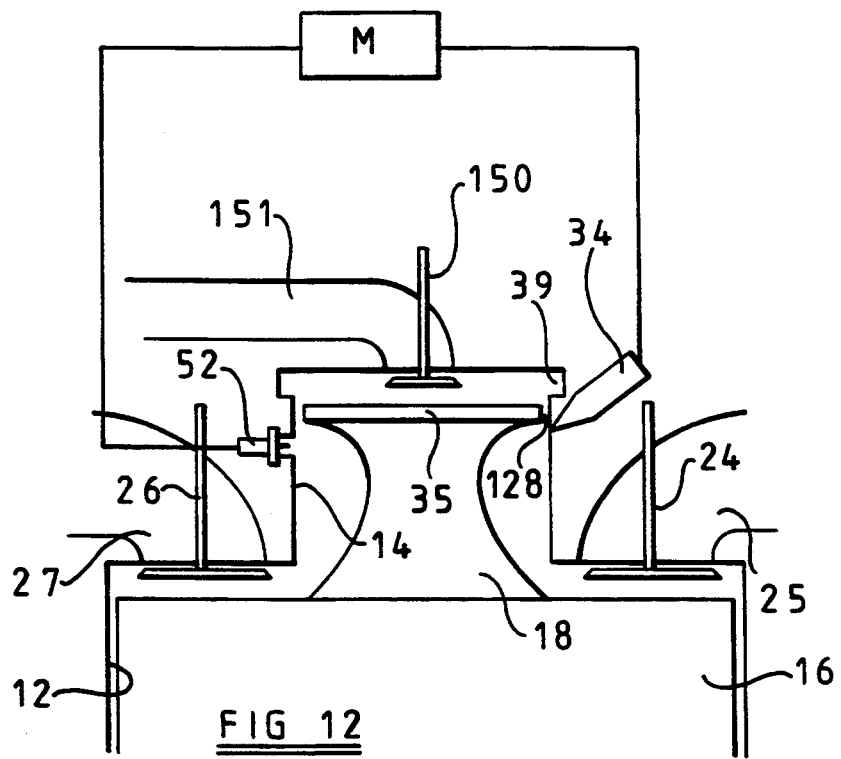

The control of the induction process to the smaller cylinder is less important if the fuel injector 31 is placed to deliver fuel directly into the smaller cylinder as is the case shown in FIG. 5 and in FIGS. 10 and 12 for the diesel engine hybrid arrangement. In FIG. 5 it is shown, therefore, that the induction process is internal, that is, air is admitted to the smaller cylinder from the larger cylinder where it enters through the inlet valve 24.

FIG. 10 is a view similar to that of FIGS. 4 to 8 showing a preferred further form of the invention, being a diesel hybrid form. The engine of FIG. 10 uses two fuel injectors 34, 60 in combination with spark plug 52 to promote STCI. Breathing of the smaller cylinder 14 can be effected in the same manner as described with reference to FIGS. 4 to 8 using one valve serving as both inlet and exhaust valve, only one valve serving solely as an exhaust valve or two separate valves serving respectively as inlet and exhaust valves communicating directly with the smaller cylinder, or no valves at all.

Fuel injector 34 injects a small quantity of fuel into the smaller cylinder 14 during the induction stroke and this fuel vaporises before it ingresses into the combustion space so that it can be ignited with a spark. Ignition of this fuel raises the pressure and temperature in the combustion space to allow the bulk of the fuel, which is injected by fuel injector 60 near the end of the compression stroke, to be ignited by compression ignition. In this way, the compression ratio necessary to ignite the fuel can be lowered.

If the injector 34 is supplied with another, more volatile fuel, such as gasoline, whilst the injector 60 is supplied with diesel fuel, the operation of the Merritt/diesel hybrid may be further improved and the compression ratio of the engine can be lowered still further, for example to between 12:1 and 13:1 instead of between 24:1 and 18:1 which is normal for conventional diesel engines.

Figure 11:
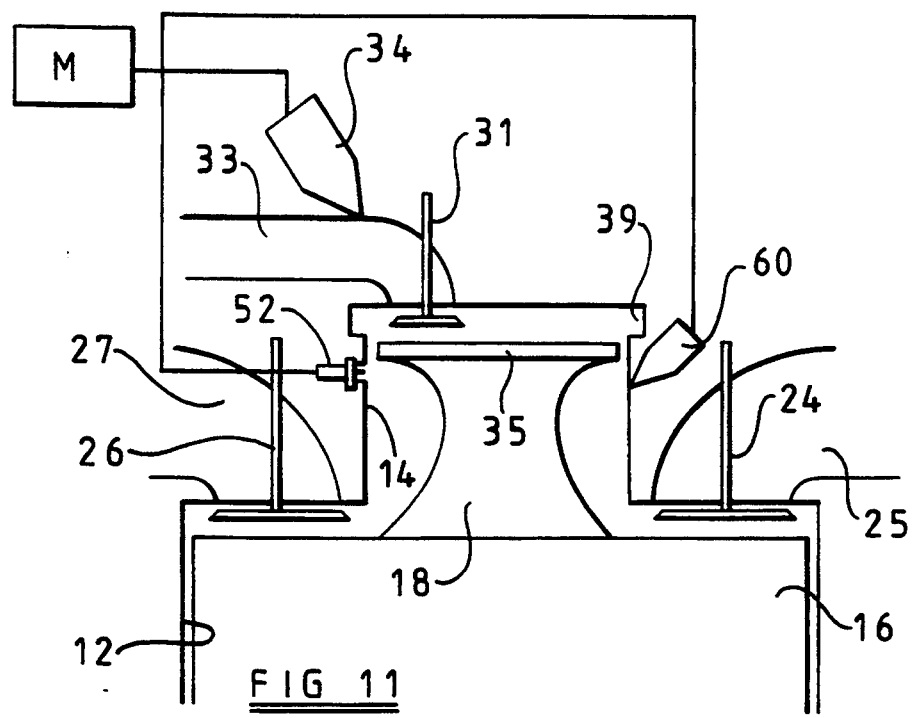

FIG. 11 is a view similar to that of FIG. 10 showing injector 34 positioned for injecting fuel into the inlet duct 33. The volatile fuel (e.g. petrol) is injected by injector 34 for admission into the smaller cylinder 14 during the induction stroke whilst injector 60 injects diesel fuel near the end of the compression stroke. Following ingression, the fuel is ignited by the spark and the diesel fuel is then ignited by the hot gases in compression ignition.

The engine of FIG. 11 can also use any of the valve breathing arrangements referred to with regard to FIG. 10.

FIG. 12 is a further view similar to that of FIGS. 10 and 11 showing a further preferred form of invention as a Merritt/diesel hybrid which can use any of the valve breathing arrangements referred to with regard to FIG. 10. In operation, the diesel fuel injector 34 first injects into the smaller cylinder 14 during the induction stroke and then injects a further quantity of fuel towards the end of the compression stroke. The fuel injector 34 is supplied with diesel fuel and the compression ratio of the engine can be lowered as described with regard to FIG. 10.

Figure 13:
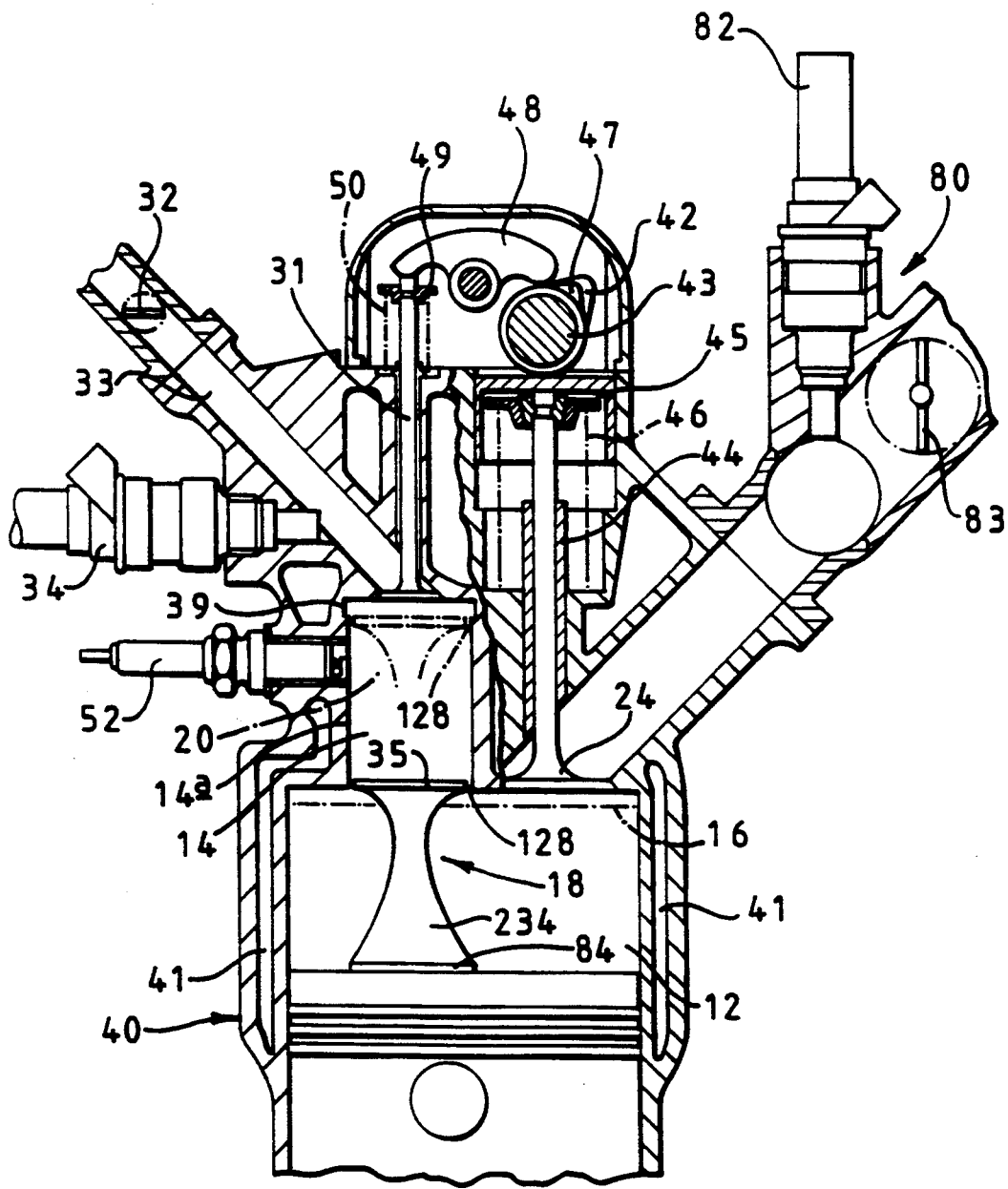

The spark ignition hybrid engine system shown in FIG. 8 in GB-A-2246394 is entirely applicable to the present invention but the method of operation differs. FIG. 8 in GB-A-2246394 is in fact reproduced here as FIG. 13. Referring to FIG. 13, the engine is capable of operation with stoichiometric fuel/air mixtures supplied through either of the two inlet valves 24 or 31, or both, since the compression ratio of the engine is kept below the value which can cause spontaneous compression ignition.

The engine of FIG. 13 can be started and idled in the Merritt Engine mode by providing fuel through injector 34 whilst injector 82 remains inactive and throttle 83 is fully open. Part load operation of the engine may continue in the Merritt mode which gives the engine the benefit of higher thermal efficiency at part load and idling, compared with the conventional spark engine of today, whilst using spark plug 52 to promote STCI.

When operating in the Merritt mode with fuel/air ratios leaner than the nitrogen oxides formation threshold, at part load, the engine is within exhaust emission legislation limits even though any three way catalytic converter used experiences free oxygen in the exhaust gas stream, NO$_x$ being absent under these conditions.

The advantage of operating in the SIGE mode, with stoichiometric fuel/air mixture and with a three way catalytic converter, is to obtain higher brake mean effective pressure (BMEP) values than possible with the Merritt operating mode, particularly when the latter operates at part load below the NO$_x$ fuel/air ratio threshold. In a vehicle it is proposed that the Merritt mode is used in urban driving and light motorway cruising whilst the SIGE mode is automatically selected to cope with full load conditions.

The switch over from the Merritt engine mode to the conventional spark ignition engine mode (SIGE) can be made to advantage near the full engine load condition when maximum air utilisation is required, in other words when all the air present in both cylinders 14 and 16 may be needed to burn the largest quantity of fuel. In this case injector 82 is energised by the engine management system whilst injector 34 is either de-energised or is operated with reduced fuel quantities. The pre-mixed fuel/air mixture entering through inlet valve 24 can be stoichiometric enabling the spark plug 52, which according to this invention can be continuously in operation, readily to ignite the mixture under the control of the engine management system.

The transition from full load to part load operation can be made gradually with throttle 83 used to reduce from full load in the sige mode until the fuel supply is completely taken over by injector 34 at which time the throttle valve 83 can be fully opened.

This hybrid operational method takes advantage of the use of a spark ignition method in the Merritt engine mode of the present invention to allow full air utilisation hence enhanced power output capability, at full load, whilst retaining the high thermal efficiency potential of the Merritt engine at part loads and at idling.

The operation of the engine of FIG. 13 differs from that described in GB-A-2246394 in that the spark plug 52 is always used to initiate ignition in the Merritt mode and the SIGE mode. The main purpose of operating in the SIGE mode is to allow greater air utilisation than possible when using the segregating mode. This leads to larger values of mean effective pressure MEP and greater power output. The segregating mode is therefore suitable for part load engine operation or at part load MEP, whilst operating at high engine thermal efficiency. Normal SIGE engines operate at much reduced thermal efficiency at part load MEP. At the same time the SIGE mode allows the same Merritt engine to achieve full load MEP comparable to normal spark engines in the operational conditions where SIGE engines operate most efficiently. In this way the hybriding of the Merritt engine operating on the STCI principle, provides an engine capable of operating with higher thermal efficiency over a wider operational load conditions than existing SIGE engines or diesel engines can now achieve.

FIG. 14 is a view similar to that of FIG. 13 in which operation of the engine in the Merritt (segregating) mode is assisted by use of a bulb 1000, valve 1001 and fan 1002 as described with reference to FIG. 9.

A requirement for operating in the SIGE mode is to keep the body minor piston 234 at a temperature low enough to avoid pre-ignition of the combustible fuel-air mixture delivered below the crown 35 in the non-segregating mode or SIGE mode. This requires the cooling of the smaller piston body 234, for example by impinging an oil jet on its base through the gudgeon pin. If such a cooling is necessary the temperature of the crown 35 may be insufficient to vaporise all the fuel delivered to the smaller cylinder during the segregation mode. In such an event the trapping of exhaust gases in the bulb 1000 provides an additional fuel vaporisation method as a compensation.

FIG. 15 is a further view of the embodiment of FIG. 5 showing the smaller piston having exited from the bore of the smaller cylinder 14 at its outer dead centre position. Breathing arrangements for the smaller cylinder 14 may take any of the forms described earlier. In FIG. 15 one exhaust valve is provided for the smaller cylinder 14. The absence of an inlet valve may be beneficial for the smaller cylinder since a partial vacuum is desirable to draw in air from the larger cylinder 12 when the pistons are at the outer dead centre position, and also to avoid excessive fuel spillage into the larger cylinder 12. The provision of exhaust duct 151 and exhaust valve 150 for the smaller cylinder 16 is desirable in order to avoid excessive pressure build up in the smaller cylinder 16 at the beginning of the induction stroke. The exhaust duct 151 communicates with the inlet duct 25 of the larger cylinder 12 to recirculate any unburned hydrocarbons and carbon monoxide. In the absence of an inlet valve as shown in FIG. 15, the fuel injector 34 communicates directly with the smaller cylinder 14, but other breathing arrangements may be different.

I claim:

1. An internal combustion engine comprising:
    at least one set of first and second cylinders, said first cylinder having a larger swept volume than said second cylinder;
    respective first and second pistons movable in said first and second cylinders;
    air inlet means communicating with said first cylinder;
    exhaust means communicating with said first cylinder;

a first fuel source for providing fuel to said second cylinder;

means defining a combustion space when said first and second pistons are substantially at an inner dead centre position, said combustion space communicating with both said first and second cylinders during an expansion stroke of said first and second pistons;

ignition means communicating with said combustion space;

inhibiting means for inhibiting ingression of fuel/air mixture from said second cylinder into said combustion space prior to said second piston reaching a preselected point in a compression stroke;

control means for triggering said ignition means to discharge ignition energy into said combustion space after commencement of said ingression and prior to completion of said ingression to ignite a portion of ingressing fuel thereby to raise temperature and pressure in said combustion space to levels sufficient to ignite a remainder of said fuel by compression ignition;

and means for ensuring that said pressure and temperature reached in said combustion space near an end of said compression stroke are insufficient to cause spontaneous compression ignition of fuel used.

2. An engine as claimed in claim 1 wherein said second piston has a crown which is spaced from and connected to a crown of said first piston and said crown of said second piston has an edge which is relatively small in an axial direction compared to a distance between said crown of said first piston and said crown of said second piston in said axial direction, thereby to define said combustion space between said crowns of said first and second pistons and a side wall of said second cylinder.

3. An engine as claimed in claim 2 wherein said ignition means is spark triggered compression ignition means.

4. An engine as claimed in claim 2 wherein said means for ensuring that said pressure and temperature reached in said combustion space near said end of said compression stroke are insufficient to cause spontaneous compression ignition of fuel used comprises a geometrical compression ratio of said engine, being a ratio of volumes within said first and second cylinders available for occupation by gas at outer and inner dead centre positions of said first add second pistons.

5. An engine as claimed in claim 4 wherein said means for ensuring that said pressure and temperature reached in said combustion space near said end of said compression stroke are insufficient to cause spontaneous compression ignition of fuel used further comprises throttle means for throttling air inducted by said first cylinder through said air inlet means to maintain gas pressure and temperature in said first and second cylinders at levels insufficient to cause spontaneous compression ignition of fuel used prior to ignition by said ignition means.

6. An engine as claimed in claim 2 having access means associated with said second cylinder for admitting fuel and air to said second cylinder during induction, said access means comprising a first port means opening into said second cylinder and a first valve means for controlling said port means.

7. An engine as claimed in claim 6 wherein said first fuel source is a low pressure fuel injector and is shielded by said first valve means.

8. An engine as claimed in claim 6 wherein said first port means serves as both inlet and exhaust port for said second cylinder.

9. An engine as claimed in claim 6 wherein said access means further comprises a second port means forming an exhaust port means for said second cylinder, and second valve means for controlling said second port means.

10. An engine as claimed in claim 2 having exhaust means associated with said second cylinder for exhausting exhaust gases therefrom, said exhaust means comprising exhaust port means opening into said second cylinder and exhaust valve means for controlling said exhaust port means, and wherein said first fuel source is a fuel injector for injecting fuel directly into said second cylinder.

11. An engine as claimed in claims 7 wherein said exhaust port means communicates with said air inlet means for providing exhaust gas recirculation.

12. An engine as claimed in claim 2 wherein said air inlet means and said exhaust means of said first cylinder serve respectively as a sole inlet and exhaust means for said second cylinder;

and said first fuel source is a fuel injector for delivering fuel directly into said second cylinder.

13. An engine as claimed in claim 8 wherein said first port means communicates with a closed volume.

14. An engine as claimed in claim 13 wherein said closed volume is variable.

15. An engine as claimed in claim 13 wherein said closed volume communicates with said air inlet means by way of a valve for controlling gas pressure in said closed volume.

16. An engine as claimed in claim 13 wherein said closed volume communicates with atmosphere by way of a valve and a fan for controlling gas pressure in said closed volume, 17. An engine as claimed in claim 2 wherein a second fuel source, in the form of a high pressure liquid fuel injector, is located such that when said crown of said second piston is at or near said inner dead centre position said second fuel source can deliver to said combustion space a quantity of fuel under pressure in addition to fuel supplied to said second cylinder by said first fuel source.

18. An engine as claimed in claim 17 having means for controlling said first fuel source to deliver a proportion of a total fuel quantity to be delivered into said second cylinder into a space above said crown of said second piston starting and finishing when said second piston is at predetermined positions spaced from said inner dead centre position, and for controlling said second fuel source to deliver a further proportion of said total fuel quantity into said combustion space when said first and second pistons are subsequently at or near said inner dead centre position.

19. An engine as claimed in claim 2 wherein said first fuel source is a high pressure fuel injector positioned in said side wall of said second cylinder for delivering fuel directly into said second cylinder both above and below said crown of said second piston.

20. An engine as claimed in claim 2 wherein a second fuel source and a throttle valve are provided in said air inlet means of said first cylinder for providing a spark ignitable fuel/air mixture to enable said engine to operate in a conventional spark ignition mode.

21. An engine as claimed in claim 2 wherein said edge of said second piston crown is radially spaced from an adjacent wall of said second cylinder to define a gap therebetween which comprises said inhibiting means.

22. An engine as claimed in claim 2 wherein said second cylinder is formed at an end thereof remote from said first cylinder with means defining a by-pass around said edge of said crown of said second piston when said second piston is at or adjacent said inner dead centre position.

23. An engine as claimed in claim 22 wherein said by-pass means is a groove which is formed in said wall of said second cylinder and extends over at least a portion of a circumference of said second cylinder.

24. A method of operating an internal combustion engine wherein the engine has:
   at least one set of first and second cylinders, said first cylinder having a larger swept volume than said second cylinder;
   respective first and second pistons movable in said first and second cylinders;
   air inlet means communicating with said first cylinder;
   exhaust means communicating with said first cylinder;
   a first fuel source for providing fuel to said second cylinder;
   means defining a combustion space when said first and second pistons are substantially at an inner dead centre position, said combustion space communicating with both said first and second cylinders during an expansion stroke of said first and second pistons;
   ignition means communicating with said combustion space;
   inhibiting means for inhibiting ingression of fuel/air mixture from said second cylinder into said combustion space prior to said second piston reaching a preselected point in a compression stroke;
   control means for triggering said ignition means;
   and means for ensuring that a pressure and temperature reached in said combustion space near an end of said compression stroke are insufficient to cause spontaneous compression ignition of fuel used;
   wherein the method comprises:
   introducing a first preselected quantity of fuel into said second cylinder during an induction and/or said compression stroke of said engine;
   and discharging ignition energy into said combustion space after commencement of Said ingression and prior to completion of said ingression to ignite a portion of ingressing fuel thereby to raise said temperature and pressure in paid combustion space to levels sufficient to ignite a remainder of said fuel by compression ignition.

25. A method as claimed in claim 24 wherein said second piston has a crown which is spaced from and connected to a crown of said first piston and said crown of said second piston has an edge which is relatively small in an axial direction compared to a distance between said crown of said first piston and said crown of said second piston in said axial direction, thereby to define said combustion space between said crowns of said first and second pistons and a side wall of said second cylinder.

26. A method as claimed in claim 25 further comprising:
   injecting a second preselected quantity of liquid fuel under high pressure into said combustion space towards said end of said compression stroke for ignition by compression ignition.

27. A method as claimed in claim 26 wherein said first preselected quantity of fuel is injected into said second cylinder during said induction stroke.

28. A method as claimed in claim 26 wherein said first preselected quantity of fuel is introduced into an inlet duct communicating with said second cylinder through an inlet valve which opens during said induction stroke.

29. A method as claimed in claim 26 wherein said second fuel is diesel fuel and said first fuel is a volatile fuel other than diesel fuel.

30. A method as claimed in claim 29 wherein said first fuel is gasoline.

31. A method as claimed in claim 25 further comprising introducing a further preselected quantity of fuel into said first cylinder during said induction stroke whilst controlling a quantity of air inducted into said first cylinder to provide a preselected fuel/air ratio mixture in said first cylinder thereby to provide with said first preselected quantity of fuel a substantially stoichiometric overall fuel/air ratio.

32. A method as claimed in claim 31 wherein said preselected fuel/air ratio is substantially stoichiometric.

33. A method as claimed in claim 25 wherein air inducted into said first cylinder is throttled to control said temperature and pressure at said end of said compression stroke to levels insufficient to cause compression ignition prior to said discharge of said ignition energy into said combustion space.

* * * * *